United States Patent
Hoppe et al.

(10) Patent No.: US 10,818,071 B1
(45) Date of Patent: Oct. 27, 2020

(54) IMAGE-BASED GEOMETRIC FUSION OF MULTIPLE DEPTH IMAGES USING RAY CASTING

(71) Applicant: Google LLC, Mountain View, CA (US)

(72) Inventors: Hugues Hoppe, Mercer Island, WA (US); Ricardo Martin Brualla, Seattle, WA (US); Harris Nover, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/523,702

(22) Filed: Jul. 26, 2019

(51) Int. Cl.
  *G06T 15/06* (2011.01)
  *G06T 7/70* (2017.01)
  *G06T 7/55* (2017.01)
  *G06T 15/20* (2011.01)
  *H04N 13/111* (2018.01)

(52) U.S. Cl.
  CPC ............... *G06T 15/06* (2013.01); *G06T 7/55* (2017.01); *G06T 7/70* (2017.01); *G06T 15/20* (2013.01); *H04N 13/111* (2018.05); *G06T 2207/10024* (2013.01); *G06T 2207/10028* (2013.01); *G06T 2207/20221* (2013.01)

(58) Field of Classification Search
  None
  See application file for complete search history.

(56) References Cited

U.S. PATENT DOCUMENTS

| | | | |
|---|---|---|---|
| 2015/0279118 A1* | 10/2015 | Dou | G06T 7/55 345/427 |
| 2016/0042553 A1* | 2/2016 | Angelidis | G06T 15/503 345/424 |
| 2018/0218510 A1* | 8/2018 | Taguchi | G06T 5/005 |
| 2019/0197786 A1* | 6/2019 | Molyneaux | G06T 7/11 |
| 2019/0362544 A1* | 11/2019 | Pekelny | G06T 17/20 |
| 2020/0066027 A1* | 2/2020 | Castaneda | G06T 15/005 |

OTHER PUBLICATIONS

Masuda, Takeshi. "Filling the signed distance field by fitting local quadrics." Proceedings. 2nd International Symposium on 3D Data Processing, Visualization and Transmission, 2004. 3DPVT 2004.. IEEE, 2004.*
Wind, Ray Marching and Signed Distance Functions (2016).*

* cited by examiner

*Primary Examiner* — Ryan M Gray
(74) *Attorney, Agent, or Firm* — Brake Hughes Bellermann LLP

(57) ABSTRACT

Techniques of rendering images includes generating signed distance values (SDVs) along a ray from a specified viewpoint in terms of projected distances along that ray from given depth images. For each pixel in an image of from the perspective of the specified viewpoint, a ray is traced into the three-dimensional scene represented by the image. An iterative step is performed along the ray, obtaining in each iteration a three-dimensional world-space point p. The result is the signed distance $s_j$ as measured from depth view $D_j$. If the absolute value of the signed distance $s_j$ is greater than some truncation threshold parameter, the signed distance $s_j$ is replaced by a special undefined value. The defined signed-distance values are aggregated to obtain an overall signed distance s. Finally, the roots or zero set (isosurface) of the signed distance field is determined.

20 Claims, 5 Drawing Sheets

US 10,818,071 B1

IMAGE-BASED GEOMETRIC FUSION OF MULTIPLE DEPTH IMAGES USING RAY CASTING

TECHNICAL FIELD

This description relates to fusion of multiple depth images.

BACKGROUND

Some computers configured to render computer graphic objects can render the objects at a specified view given multiple, existing views. For example, given several depth images and color images captured from cameras about a scene that includes such computer graphic objects, a goal may be to synthesize a new view of the scene from a different viewpoint. The scene can be either real, in which case the views are captured using physical color and depth sensors, or synthetic, in which case the views are captured using rendering algorithms such as rasterization or ray tracing. For a real scene, there exist many depth-sensing technologies, such as time-of-flight sensors, structured-light-based sensors, and stereo or multi-view stereo algorithms. Such technologies may involve visible or infrared sensors with passive or active illumination patterns, where the patterns may be temporally varying.

SUMMARY

In one general aspect, a method can include receiving, by processing circuitry of a computer configured to render images of objects, depth image data representing a plurality of depth images of an object, each of the plurality of depth images being a depth image of the object captured from a respective viewpoint, the depth image representing a distance between an image capture device and the object. The method can also include receiving viewpoint data representing a target viewpoint of an image of the object, the target viewpoint being different from the respective viewpoint from which each of the plurality of depth images are captured, the image including a plurality of pixels. The method can further include generating ray data representing a plurality of rays toward the image, each of the plurality of rays corresponding to a respective pixel of the plurality of pixels of the image. The method can further include, for each of the plurality of rays: generating signed distance value (SDV) data representing a plurality of SDVs at each of a plurality of locations along that ray, each of the plurality of SDVs at each of the plurality of locations along that ray corresponding to a respective depth image of the plurality of depth images; performing an aggregation operation on the SDV data at each of the plurality of locations along that ray to produce aggregated SDV data along that ray representing an aggregated SDV at each of the plurality of locations along the ray; and determining a location along that ray where the aggregated SDV satisfies a specified condition. The method can further include generating a depth image of the object captured from the perspective of the specified viewpoint based on the locations along the plurality of rays for which the respective aggregated SDV for that ray is equal to the specified value.

The details of one or more implementations are set forth in the accompanying drawings and the description below. Other features will be apparent from the description and drawings, and from the claims.

DETAILED DESCRIPTION

Figure 1:
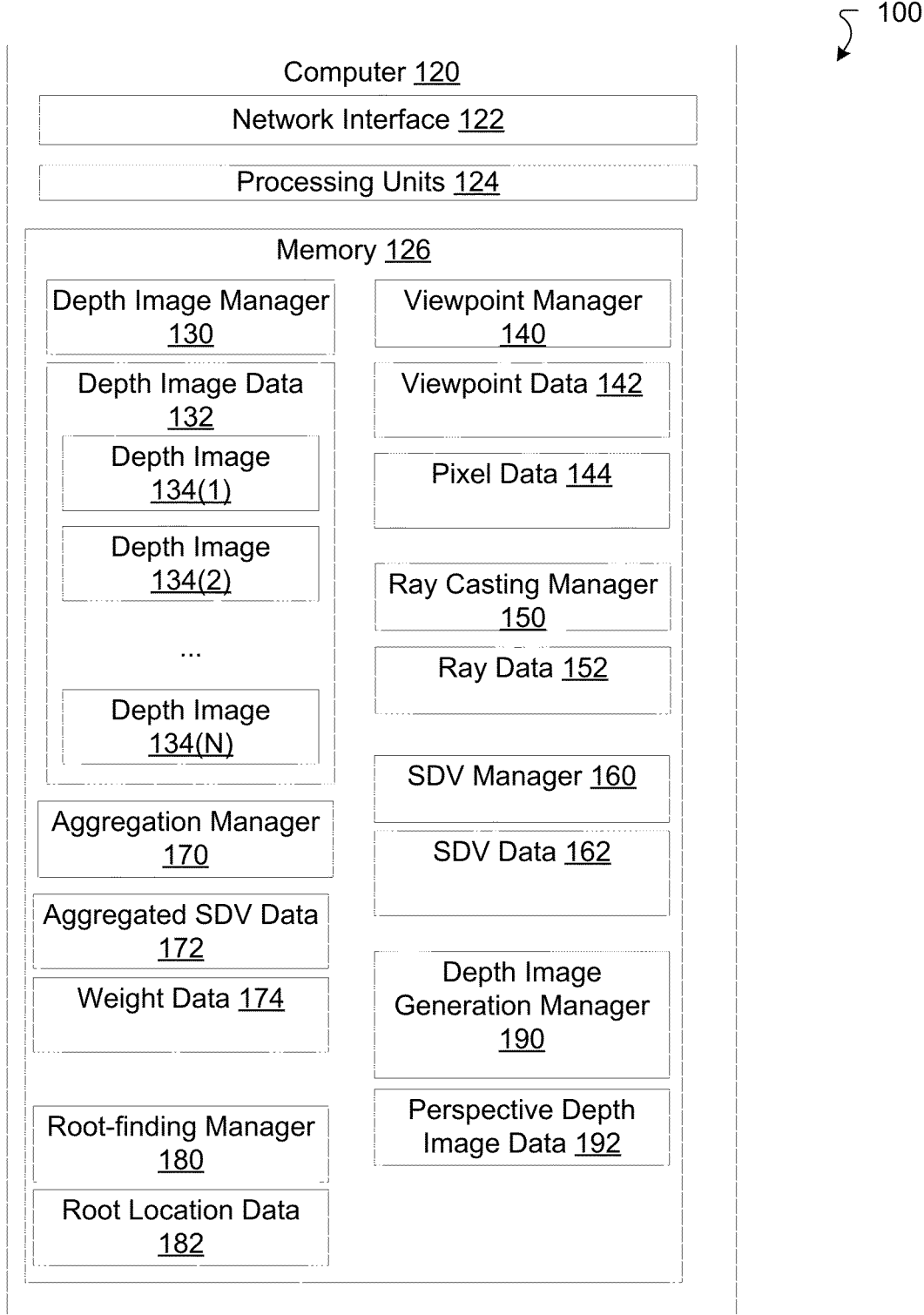
FIG. 1 is a diagram that illustrates an example electronic environment for implementing the technical solution described herein.

The context described herein is computer graphics rendering from existing views. Given several depth images and color images captured from cameras about a scene, it is desired to synthesize a new view of the scene from a different viewpoint. The scene can be either physical (in which case the views are captured using physical color and depth sensors) or synthetic (in which case the views are captured using rendering algorithms such as rasterization or ray tracing).

For a physical scene, there exist many depth-sensing technologies, such as time-of-flight sensors, structured-light-based sensors, and stereo (or multi-view stereo) algorithms. These technologies may involve visible or infrared sensors, optionally with passive or active illumination patterns, where the patterns may be temporally varying.

The general problem is to merge the information from the plurality of views into a consistent representation of the scene, so that the reconstructed scene can be rendered with correct inter-surface occlusion and parallax from the specified viewpoint. In a physical scene, both the depth and color sensors create noisy data. Additionally, the acquired depth images can have large errors, particularly near depth discontinuities such as silhouettes. Therefore, it is desirable to adaptively vary the importance given to the different views when merging them, e.g. giving less preference to views that see a scene surface obliquely if it is visible in a more head-on direction from another view. The process of merging the views into a consistent geometric representation is referred to as "geometric fusion."

Conventional approaches to solving this general problem include defining a truncated signed-distance field (TSDF) from each given depth image in each voxel of a volume (three-dimensional) grid, accumulating the TSDFs for each voxel of the volume grid, and approximating the representation of the scene using the zeroes of the TSDF over all voxels.

A technical problem involved in the above-described conventional approaches to solving the technical problem use an enormous amount of memory due to the volume grid. Further, the conventional approaches encounter problems with noisy depth data and near depth discontinuities such as silhouettes.

In contrast to the conventional approaches to solving the above-described technical problem, a technical solution to the above-described technical problem includes generating signed distance values (SDVs) along a ray from a specified viewpoint in terms of projected distances along that ray from given depth images. For each pixel in an image from the perspective of the specified viewpoint, a ray is traced into a three-dimensional scene represented by the image. An iterative step is performed along the ray, obtaining in each iteration a three-dimensional world-space point p. For each depth view $D_j$ associated with a given depth image, the point p is projected into the depth image, a depth value is sampled from the depth image, and the sampled depth value is subtracted from the z coordinate (depth) of p with respect to the depth view camera. The result is the signed distance $s_j$ as measured from depth view $D_j$. If the absolute value of the signed distance $s_j$ is greater than some truncation threshold parameter, the signed distance $s_j$ is replaced by a special undefined value. The defined signed-distance values are aggregated to obtain an overall signed distance s. Finally, the roots or zero set (isosurface) of the signed distance field is determined.

A technical advantage of the above-described technical solution is that the technical solution does not require accumulating or aggregating information from the multiple views into a volumetric representation stored in memory. Therefore, a computer operating according to the technical solution is able to operate with less memory space and bandwidth. Further, the above-described technical solution is robust in the presence of noisy depth data and in the vicinity of depth discontinuities.

FIG. 1 is a diagram that illustrates an example electronic environment 100 in which the above-described improved techniques may be implemented. As shown, in FIG. 1, the example electronic environment 100 includes a computer 120.

The computer 120 is configured to render images of objects. The computer 120 includes a network interface 122, one or more processing units 124, and memory 126. The network interface 122 includes, for example, Ethernet adaptors, and the like, for converting electronic and/or optical signals received from a network to electronic form for use by the computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the computer 120 can be, or can include processors (e.g., processing units 124) configured to process instructions stored in the memory 126. Examples of such instructions as depicted in FIG. 1 include a depth image manager 130, a viewpoint manager 140, a ray casting manager 150, a SDV manager 160, an aggregation manager 170, a root-finding manager 180, and a depth image generation manager 190. Further, as illustrated in FIG. 1, the memory 126 is configured to store various data, which is described with respect to the respective managers that use such data.

The depth image manager 130 is configured to receive depth image data 132. The depth image manager 130 receives the depth image data 132, in some implementations, over a network via the network interface 122. In some implementations, the depth image manager 130 receives the depth image data 132 from a local storage device, e.g., a hard drive, a flash drive, a storage disk, and so on.

The depth image data 132 represents a plurality of depth images 134(1) . . . 134(N) of an object. An example of a depth image may be seen in FIG. 4, e.g., depth image 410. Each depth image, e.g., depth image 134, represents a map of distances—or depths—along a line from a camera to pixels on the surface of the object. The camera is oriented with respect to the object at an angle indicated by a viewpoint from which the depth image is captured. In the examples described herein, there are two given depth images of an object to be fused into a new depth image captured from a specified viewpoint. Nevertheless, in some implementations, there may be more than two depth images to be fused.

The viewpoint manager 140 is configured to receive viewpoint data 142. In some implementations, the viewpoint manager 140 receives the viewpoint data 142 in response to user input or during runtime of an application. In some implementations, the viewpoint manager 140 receives the viewpoint data 142 over a network via network interface 122. In some implementations, the viewpoint manager 140 receives the viewpoint data 142 from a local storage device, e.g., a hard drive, a flash drive, a storage disk, and so on.

The viewpoint data 142 represents an orientation of a target viewpoint from which new depth image data is generated. In some implementations, the viewpoint data 142 includes a camera matrix. In some implementations, the camera matrix is a 3×4 matrix representing a mapping from three-dimensional camera coordinates to two-dimensional image coordinates.

The ray casting manager 150 is configured to generate ray data 152 based on a three-dimensional scene represented by an image as seen from the perspective of the target viewpoint. For example, the ray casting manager 150 is configured to cast a respective ray for each pixel of the image. In some implementations, the ray casting manager 150 casts rays using a parallel process, i.e., using multiple threads and/or processors simultaneously. In such implementations, operations on each ray that has been cast are performed in parallel similarly. In some implementations, the ray casting manager 150 casts the rays in parallel across the pixels of the image using CUDA warps. In some implementations, the ray casting manager 150 casts the rays in parallel across the pixels of the image using an OpenGL fragment shader.

The ray data 152 represents rays used to form an image of a three-dimensional scene including the object. Each ray represented by the ray data 152 is associated with a pixel of the image. The rays represented by the ray data 152 emanate from a viewpoint origin (e.g., a camera) to a pixel of the image.

The SDV manager 160 is configured to generate SDV data 162 by computing SDVs along each ray at various positions along that ray for each of the depth images. To accomplish this, in some implementations, the SDV manager 160 is configured to step along the ray iteratively until a stopping condition is satisfied. In some implementations, the stopping condition is that the location of the next step crosses a surface of the object associated with a depth image. In some implementations, the step size along the ray is proportional to an absolute value of a distance between a current location along the ray of a step and a surface of the object. In this way, the steps become finer as the locations approach the object surface associated with the viewpoint a depth image. In some implementations, if the absolute value of a SDV is greater than some truncation threshold value, then that SDV is replaced by a specified value. In some implementations, the specified value is undefined.

The SDV data 162 represents SDVs (signed distance values) along each ray for each depth image. As a convention, the sign of the SDVs herein is positive for positions along a ray between the viewpoint origin and the surface associated with a viewpoint and negative for positions along a ray beyond the surface.

A point along the ray is expressed as p=o+αv, where o denotes the target viewpoint, v is the unit view direction of the ray, and the scalar α encodes parametric location along the ray. Given a ray point p, for each depth image j, we transform p into the camera space of the depth image, compute the perspective projection to determine the pixel coordinates of point p in the camera image, and sample the stored depth value. In some implementations, a weight value is also stored. The depth value is subtracted from the z coordinate of the camera-space point to obtain a signed-distance value $s_j$. Note, as mentioned above, that $s_j$ is positive if the point p lies in front of the frontmost surface visible from the depth camera, or negative otherwise.

The aggregation manager 170 is configured to perform an aggregation operation on the SDVs over the depth images at each location along the ray to produce aggregated SDV data 172. In some implementations, the aggregation operation is a summing of the SDVs across the depth images. In some implementations, the summing is a weighted sum with a respective weight being associated with each depth image.

The aggregated SDV data 172 represents the aggregated SDV along the ray. The weight data 172 represents the weights used to produce the aggregated SDV data 172.

The root-finding manager 180 is configured to perform a root-finding operation to produce a root of the aggregated SDV along each of the rays. In some implementations, the root-finding operation includes determining a location at which the aggregated SDV changes sign, e.g., from positive to negative, and performing a binary search operation to locate the root (e.g., where the aggregated SDV along the ray is zero or some other constant).

The root location data 182 represents the roots of the aggregated SDV along each ray as determined via the root-finding operation described above.

The depth image generation manager 190 is configured to generate a depth image of the object captured from the target viewpoint represented by the viewpoint data 142. The depth image generation manager 190, along these lines, generates an object surface based on the roots represented by the root location data 182. In some implementation, the depth image generation manager 190 performs an interpolation operation to produce a continuous surface from the discrete roots.

The perspective depth image data 192 represents the output surface of the object from the target viewpoint.

Figure 2:
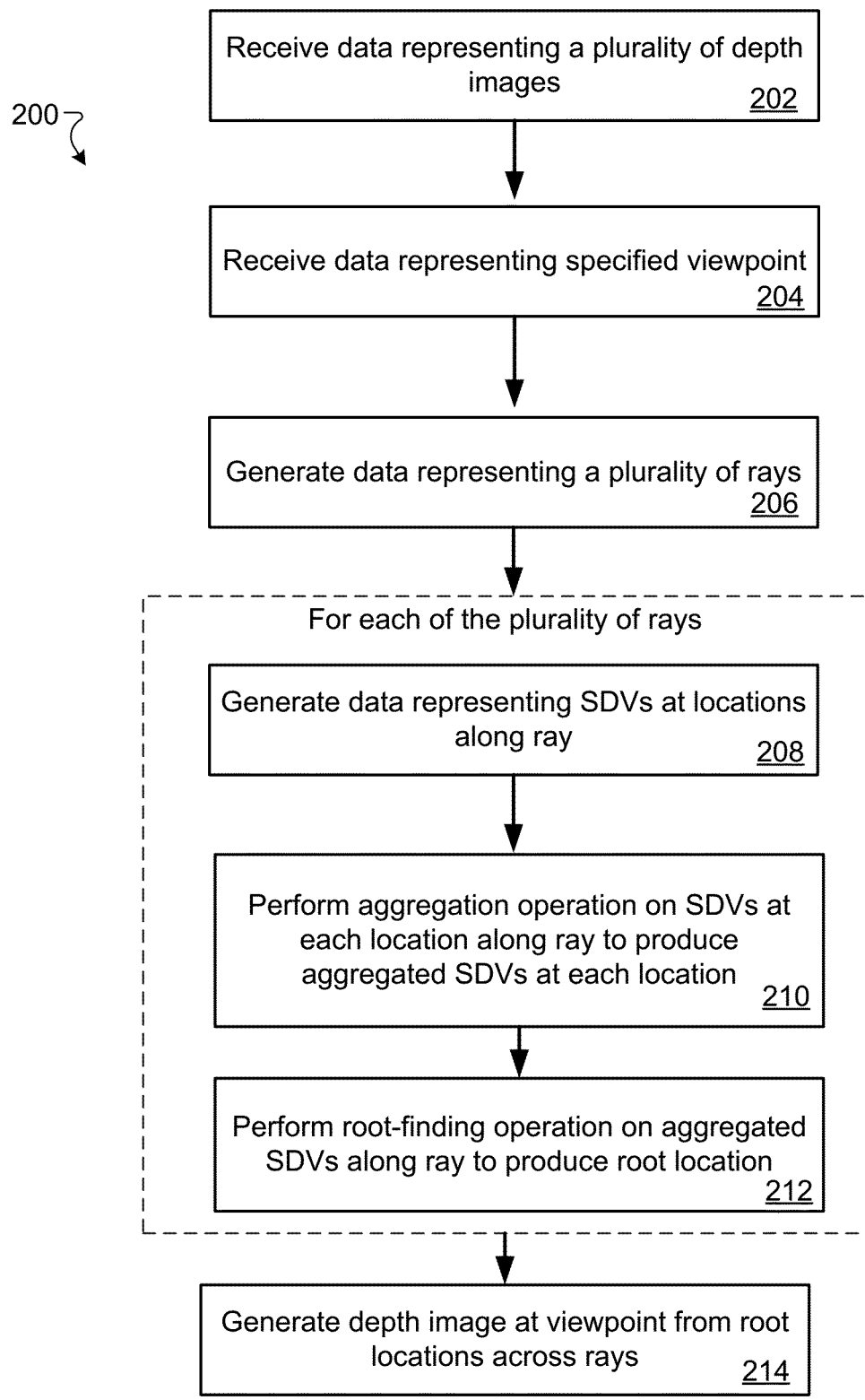
FIG. 2 is a flow chart that illustrates an example method of performing the technical solution within the electronic environment shown in FIG. 1.

FIG. 2 is a flow chart depicting an example method 200 of rendering images of objects. The method 200 may be performed by software constructs described in connection with FIG. 1, which reside in memory 126 of the user device computer 120 and are run by the set of processing units 124.

At 202, the depth image manager 130 receives depth image data 132 representing a plurality of depth images 134(1 . . . N) of an object, each of the plurality of depth images being a depth image of the object captured from a respective viewpoint, the depth image representing a distance between a specified camera and an image of the object.

At 204, the viewpoint manager 140 receives viewpoint data 142 representing a target viewpoint of an image of the object, the target viewpoint being different from the viewpoint from which each of the plurality of depth images are captured, the image including a plurality of pixels.

At 206, the ray casting manager 150 generates ray data 152 representing a plurality of rays toward the image, each of the plurality of rays corresponding to a respective pixel of the plurality of pixels of the image.

At 208, for each of the plurality of rays, the SDV manager 160 generates SDV data 162 representing a plurality of SDVs at each of a plurality of locations along that ray, each of the plurality of SDVs at each of the plurality of locations along that ray corresponding to a respective depth image of the plurality of depth images.

At 210, for each of the plurality of rays, the aggregation manager 170 performs an aggregation operation on the SDV data at each of the plurality of locations along that ray to produce aggregated SDV data 172 along that ray representing an aggregated SDV at each of the plurality of locations along the ray. In some implementations, the aggregation operation includes generating a weighted sum of the plurality of SDVs at each of the plurality of locations along that ray using the weight data 174.

At 212, for each of the plurality of rays, the root-finding manager 180 performs a root-finding operation to produce a location (i.e., from location data 182) along that ray where the aggregated SDV is equal to a specified value.

At 214, the depth image generation manager 190 generates a depth image of the object captured from the perspective of the target viewpoint based on the locations along the plurality of rays for which the respective aggregated SDV for that ray is equal to the specified value.

Figure 3:
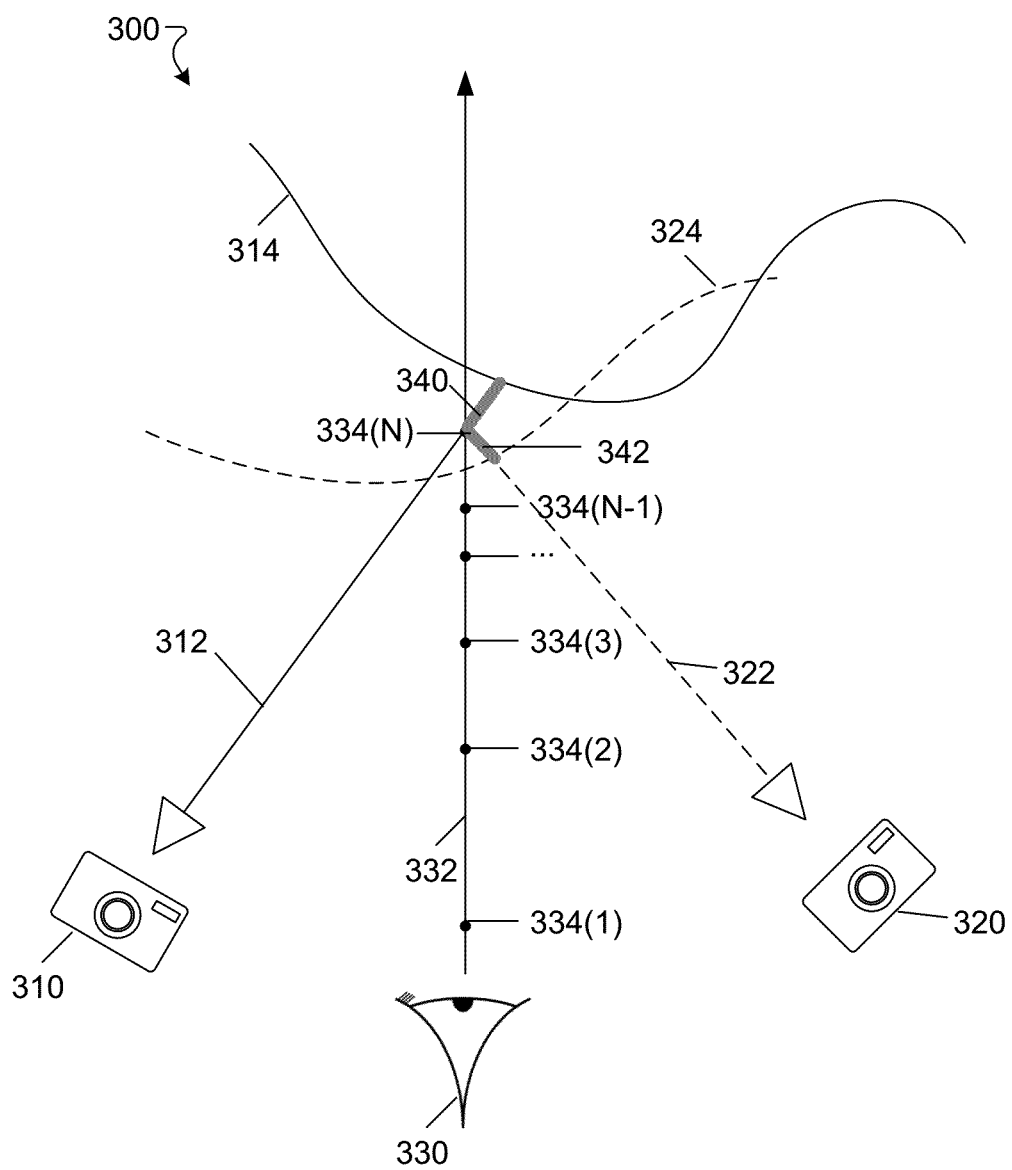
FIG. 3 is a diagram that illustrates an example geometry for determining a point along a ray at which the depth map at the specified viewpoint is determined according to the technical solution performed within the electronic environment shown in FIG. 1.

FIG. 3 is a diagram that illustrates an example geometry 300 for determining a point along a ray at which a target depth map is generated at the target viewpoint. As shown in FIG. 3, two depth images 314 and 324 are captured from viewpoints defined by direction vectors 312 and 322 and cameras 310 and 320, respectively. The depth images 314 and 324 are surfaces of an object as seen from the respective viewpoints defined by vectors 312 and 322.

As shown in FIG. 3, the geometry 300 further includes a target viewpoint 330 for which a geometric fused image, or surface of the object, is determined. Along these lines, a ray 332 is cast along a direction. The ray 332 corresponds to a pixel of an image of the object within a three-dimensional scene. For example, the object may take the form of a person having various features (e.g., a face, arms, a torso, legs) within a scene (e.g., with other objects at various depths and a background).

Along the ray 332 (one of several rays, each corresponding to a pixel of the image in the scene), there is an initial sampling position on the ray 334(1). At this position and for each of the depth images 314 and 324, the SDV associated with that depth image is computed. The SDVs associated with the depth images are aggregated. If the aggregated SDV is positive, then the computer 120 takes another step to a new location 334(2) along the ray 332.

As described above, a point p (e.g., 334(1 . . . N)) along the ray is expressed as p=o+αv, where o denotes the viewpoint, v is the unit view direction of the ray, and the scalar α encodes parametric location along the ray. Given a ray point p, for each depth image j (314 or 324 in FIG. 3), we transform p into the camera space of the depth image 314/324, compute the perspective projection to determine the pixel coordinates of point p in the camera image, and sample the stored depth value. In some implementations, a weight value is also stored. The depth value is subtracted from the z coordinate of the camera-space point to obtain a SDV $s_j$. Note, as mentioned above, that $s_j$ is positive if the point p lies in front of the frontmost surface visible from the depth camera, or negative otherwise.

In some implementations, the weight value used to aggregate the SDVs is based on an inner product of the direction of the ray 332 and the directions 312 and 322. In some implementations, the weight value increases with the inner product so that surfaces seen fully in the target viewpoint 330 are given greater weight than those at oblique directions and not seen as fully. In some implementations, the weights may be decreased in the presence of occlusions in the scene. In some implementations, the weights are precomputed based on at least one of (i) the distance between the specified camera 310, 320 for the viewpoint from which that depth image was captured and an image of the object (i.e., surfaces 314, 324), and (ii) a gradient of the distance along the direction of that viewpoint. The intent is that surfaces that are perpendicular to the view direction should be assigned greater weight than surfaces that are oblique, because the perpendicular surfaces are likely to be more geometrically accurate.

Accordingly, the process of determining the depth image from the target viewpoint 330 includes updating the value of the scalar $\alpha$ based on the aggregated SDV s at the current location along the ray 332. As described above, in some implementations, the change in the value of the scalar $\alpha$ decreases with the distance between the location and a surface of a depth image. In some implementations, if the SDV s is large, the step size is accordingly large (and related to the truncation threshold value).

As shown in FIG. 3, the aggregated SDVs along the ray 332 at the locations 334(1) . . . 334(N-1) are positive because the points are in front of both surfaces 314 and 324. In contrast, the point along the ray at the location 334(N) is in between the surfaces 314 and 324. At this location, the SDV may be positive or negative. If the SDV is positive, there is another step forward in between the surfaces. If the SDV is negative, however, as shown in FIG. 3, then there is a sign change and there is a root between locations 334(N-1) and 334(N).

The computation of the SDVs at location 334(N) along ray 332 is shown in some detail in FIG. 3. The direction vectors 312 and 322 are normal to the respective surfaces 314 and 324. Along these normals, the distances 340 and 342 between the location 334(N) and the respective surfaces 314 and 324 are measured (e.g., computed, generated). The distances 340 and 342 then are the above-described perspective projection of the point at the location 334(N) in the respective camera images 310 and 320.

Once the interval between the locations 334(N-1) and 334(N) is determined to have a sign change, a finer root-finding operation is used to determine the location along the ray where the aggregated SDV is zero. As mentioned above, in some implementations the root-finding operation includes a binary search algorithm. In some implementations, the binary search includes a linear estimator.

In some implementations, there is a lower bound and upper bound precomputed for the value of the scalar $\alpha$ along the ray 332. In such an implementation, these lower bounds are obtained by computing a forward map (rasterization) of the depth pixels from each depth image into a coarse-resolution framebuffer over the new view. In this rasterization pass, the lower bound is updated using an atomic-min update, and the upper bound is updated using an atomic-max update.

The rasterization step can be combined with the depth pre-processing stage that precomputes the weights for each depth view, and thus avoiding having to read the depth images twice during pre-processing.

Figure 4:
FIG. 4 is a diagram that illustrates an example fused depth map generated according to the technical solution performed within the electronic environment shown in FIG. 1.

FIG. 4 is a diagram that illustrates an example geometric fusion 400 of depth maps 410 and 420 to produce depth map 430. Depth map 410 is a depth image of a seated person from a first oblique viewpoint; this could correspond to viewpoint 310 in FIG. 3. Depth map 420 is a depth image of the seated person from a second oblique viewpoint; this could correspond to viewpoint 320 in FIG. 3. The specified viewpoint for the fused depth image 430 is facing directly in front of the person and could correspond to viewpoint 330 in FIG. 3.

In depth maps 410 and 420, the depth values are shown in grayscale ranging from dark (indicating small depth values) to light (indicating large depth values). White color indicates background (essentially infinite depth). Black color indicates unknown or undefined depth.

The ray casting approach used to generate the depth image 430 uses far fewer resources than previous volumetric-based techniques and may be performed in real time. This is useful in applications such as teleconferencing.

In some implementations, the computer 120 also includes a color image manager that is configured to receive color image data representing a plurality of color images. Each of the plurality of color images is a color image of the object captured from a respective viewpoint. Accordingly, for each pixel of a target color image oriented at the target viewpoint, the color image manager then is configured to generate a depth value of the target depth image corresponding to that pixel, identify a point in world space corresponding to the depth value, perform a projection operation by projecting that point into a surface of that color image to produce a color of a plurality of colors of that pixel corresponding to that color image, and perform a blending operation on the plurality of colors of that pixel to produce a blended color of that pixel. In some implementations, the colors of that pixel are blended according to a respective weight corresponding to each of the plurality of color images. In some implementations, the weight corresponding to a color image is based on an inner product of a normal to the image at the pixel and an orientation of the color image. One possible application of the color image manager as described above is to synthesize a new color from a target viewpoint without saving the depth view from the target viewpoint.

In some implementations, the identified point may not be visible in a color view because it is not a frontmost surface in that view. In such implementations, as a preprocess, for each color view a depth image is computed by treating the color view as a target view for which to generate a target depth image from the input depth images. Then, given the point p and each color view, the depth of p is compared in the color view's camera frame (as given by the color view's camera parameters) with the depth of p in the precomputed depth image associated with the color camera. If the depth stored in the precomputed depth image is smaller than the depth in the color view's camera frame, it may be deduced that in the color view p p is occluded by another surface. In this case, the color value is stored in that particular color image. That is, a color blend weight of that color sample may be set to zero.

Figure 5:
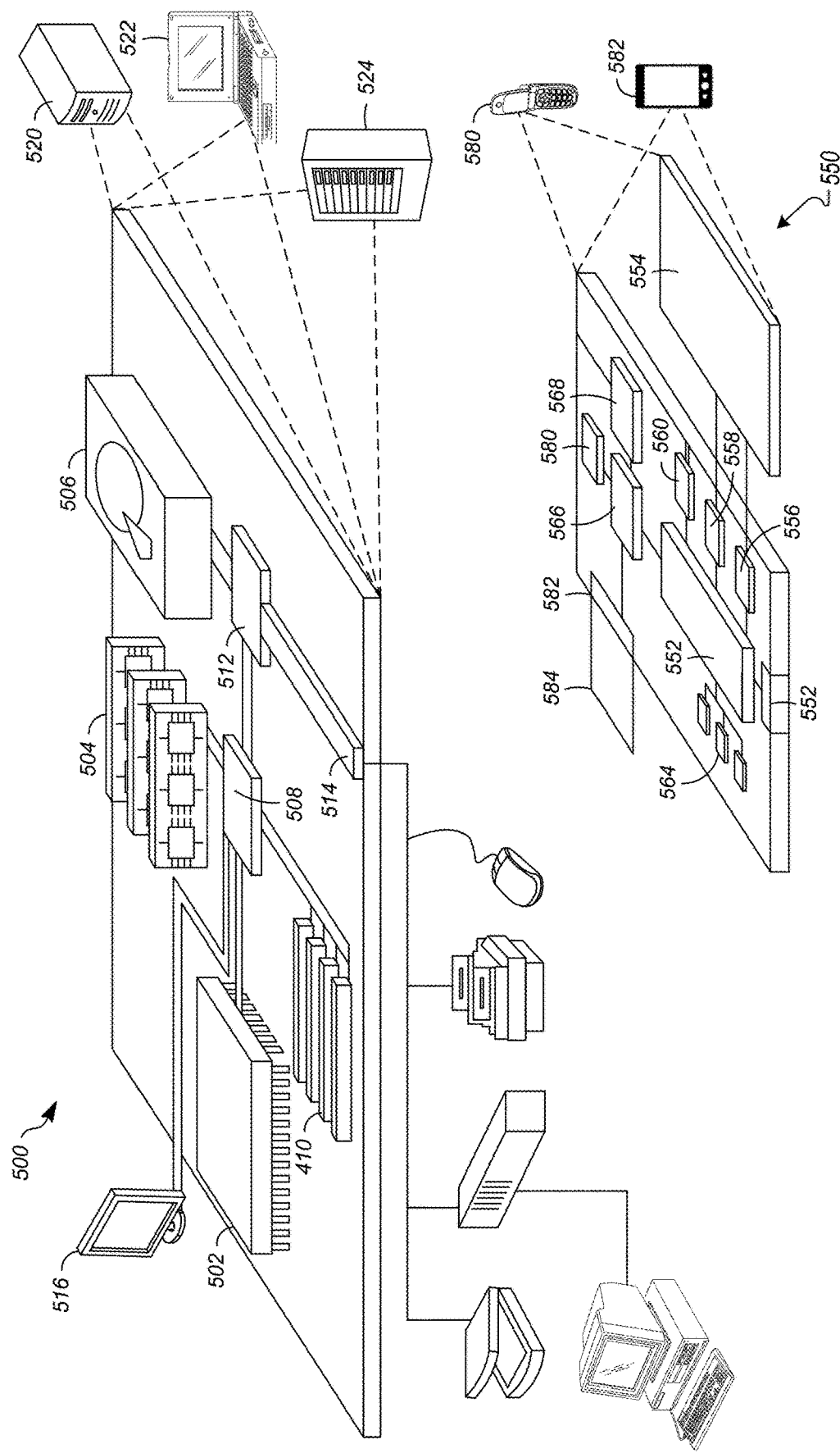
FIG. 5 illustrates an example of a computer device and a mobile computer device that can be used with circuits described here.

FIG. 5 illustrates an example of a generic computer device 500 and a generic mobile computer device 550, which may be used with the techniques described here.

As shown in FIG. 5, computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 450, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Returning to FIG. 1, in some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the compression computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the compression computer 120.

The components (e.g., modules, processing units 124) of the compression computer 120 can be configured to operate based on one or more platforms (e.g., one or more similar or different platforms) that can include one or more types of hardware, software, firmware, operating systems, runtime libraries, and/or so forth. In some implementations, the components of the compression computer 120 can be configured to operate within a cluster of devices (e.g., a server farm). In such an implementation, the functionality and processing of the components of the compression computer 120 can be distributed to several devices of the cluster of devices.

The components of the computer 120 can be, or can include, any type of hardware and/or software configured to process attributes. In some implementations, one or more portions of the components shown in the components of the computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computer 120 can be, or can include, a software module configured for execution by at least one processor (not shown). In some implementations, the functionality of the components can be included in different modules and/or different components than those shown in FIG. 1.

Although not shown, in some implementations, the components of the computer 120 (or portions thereof) can be configured to operate within, for example, a data center (e.g., a cloud computing environment), a computer system, one or more server/host devices, and/or so forth. In some implementations, the components of the computer 120 (or portions thereof) can be configured to operate within a network. Thus, the components of the computer 120 (or portions thereof) can be configured to function within various types of network environments that can include one or more devices and/or one or more server devices. For example, a network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the computer 120 can be, or can include, processors configured to process instructions stored in a memory. For example, the depth image manager 130 (and/or a portion thereof), the viewpoint manager 140 (and/or a portion thereof), the ray casting manager 150 (and/or a portion thereof), the SDV manager 160 (and/or a portion thereof), the aggregation manager 170 (and/or a portion thereof), the root-finding manager 180 (and/or a portion thereof), and the depth image generation manager 190 (and/or a portion thereof) can be a combination of a processor and a memory configured to execute instructions related to a process to implement one or more functions.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
    receiving, by processing circuitry of a computer configured to render images of objects, depth image data representing a plurality of depth images of an object, each of the plurality of depth images being a depth image of the object captured from a respective viewpoint, the depth image representing a distance between an image capture device and the object;
    receiving viewpoint data representing a target viewpoint of an image of the object, the target viewpoint being different from the respective viewpoint from which each of the plurality of depth images are captured, the image including a plurality of pixels;
    generating ray data representing a plurality of rays toward the image, each of the plurality of rays corresponding to a respective pixel of the plurality of pixels of the image;
    for each of the plurality of rays:
        generating signed distance value (SDV) data representing a plurality of SDVs at each of a plurality of locations along that ray, each of the plurality of SDVs at each of the plurality of locations along that ray corresponding to a respective depth image of the plurality of depth images;
        performing an aggregation operation on the SDV data at each of the plurality of locations along that ray to produce aggregated SDV data along that ray representing an aggregated SDV at each of the plurality of locations along the ray; and
        determining a location along that ray where the aggregated SDV satisfies a specified condition; and
    generating a target depth image of the object captured from the perspective of the target viewpoint based on the locations along the plurality of rays for which the respective aggregated SDV for that ray satisfies the specified condition.

2. The method as in claim 1, wherein generating the ray data includes:
    performing a ray casting operation across the plurality of pixels of the image.

3. The method as in claim 2, wherein the ray casting operation is performed in parallel.

4. The method as in claim 1, wherein performing the aggregation operation on the SDV data for each of the plurality of rays includes:
    producing a plurality of weights, each of the plurality of weights corresponding to a respective depth image of the plurality of depth images; and
    generating, as the aggregated SDV data along that ray, a weighted sum of the plurality of SDVs at each of the plurality of locations along that ray, the weighted sum resulting from multiplying the SDV at each of the plurality of locations along that ray corresponding to a depth image of the plurality of depth images by the weight of the plurality of weights corresponding to the depth image.

5. The method as in claim 4, wherein producing the plurality of weights includes:
  prior to generating the ray data, performing, for each of the plurality of depth images, a respective precomputing operation based on at least one of (i) the distance between the specified camera for the viewpoint from which that depth image was captured and an image of the object, and (ii) a gradient of the distance along the direction of that viewpoint.

6. The method as in claim 4, wherein producing the plurality of weights includes, for each of the plurality of depth images:
  identifying an orientation of a surface of the object at the viewpoint from which that depth image was captured; and
  computing, as the weight of the plurality of weights corresponding to that depth image, a value that increases with an inner product of the orientation and the viewpoint.

7. The method as in claim 1, wherein generating the SDV data includes:
  performing a sampling operation along the ray to produce the plurality of locations along the ray, each of the plurality of locations having a spacing to the next location of the plurality of locations, the spacing being proportional to an absolute value of a distance between that location and a surface of the object.

8. The method as in claim 1, wherein determining the location along each of the plurality of rays where the aggregated SDV satisfies the specified condition includes:
  identifying a location of the plurality of locations at which the aggregated SDV changes sign; and
  performing a binary search operation over a region defined by the identified location and a previous location to produce a location of a root.

9. The method as in claim 1, wherein generating the SDV data includes, for each of the plurality of depth images:
  at a location of the plurality of locations along the ray, measuring, as the SDV, a distance along the viewpoint along which that depth image is captured between the location and a surface of the object corresponding to the viewpoint.

10. The method as in claim 1, wherein generating the SDV data includes:
  in response to an absolute value of an SDV of the plurality of SDVs being greater than a specified threshold, changing the value of the SDV to a specified value.

11. A computer program product comprising a nontransitive storage medium, the computer program product including code that, when executed by processing circuitry of a server computing device configured to render images of objects, causes the processing circuitry to perform a method, the method comprising:
  receiving depth image data representing a plurality of depth images of an object, each of the plurality of depth images being a depth image of the object captured from a respective viewpoint, the depth image representing a distance between an image capture device and the object;
  receiving viewpoint data representing a target viewpoint of an image of the object, the target viewpoint being different from the respective viewpoint from which each of the plurality of depth images are captured, the image including a plurality of pixels;
  generating ray data representing a plurality of rays toward the image, each of the plurality of rays corresponding to a respective pixel of the plurality of pixels of the image;
  for each of the plurality of rays:
    generating signed distance value (SDV) data representing a plurality of SDVs at each of a plurality of locations along that ray, each of the plurality of SDVs at each of the plurality of locations along that ray corresponding to a respective depth image of the plurality of depth images;
    performing an aggregation operation on the SDV data at each of the plurality of locations along that ray to produce aggregated SDV data along that ray representing an aggregated SDV at each of the plurality of locations along the ray; and
    determining a location along that ray where the aggregated SDV satisfies a specified condition; and
  generating a depth image of the object captured from the perspective of the target viewpoint based on the locations along the plurality of rays for which the respective aggregated SDV for that ray satisfies the specified condition.

12. The computer program product as in claim 11, wherein generating the ray data includes:
  performing a ray casting operation across the plurality of pixels of the image.

13. The computer program product as in claim 11, further comprising, for each of the plurality of rays:
  performing a bounding operation to generate an upper bound and a lower bound of values of the plurality of locations corresponding to that ray.

14. The computer program product as in claim 11, wherein performing the aggregation operation on the SDV data for each of the plurality of rays includes:
  producing a plurality of weights, each of the plurality of weights corresponding to a respective depth image of the plurality of depth images; and
  generating, as the aggregated SDV data along that ray, a weighted sum of the plurality of SDVs at each of the plurality of locations along that ray, the weighted sum resulting from multiplying the SDV at each of the plurality of locations along that ray corresponding to a depth image of the plurality of depth images by the weight of the plurality of weights corresponding to the depth image.

15. The computer program product as in claim 14, wherein producing the plurality of weights includes, for each of the plurality of depth images:
  identifying an orientation of a surface of the object at the viewpoint from which that depth image was captured; and
  computing, as the weight of the plurality of weights corresponding to that depth image, a value that increases with an inner product of the orientation and the viewpoint.

16. The computer program product as in claim 11, wherein the method further comprises:
  receiving color image data representing a plurality of color images of an object, each of the plurality of color images being a color image of the object captured from a respective viewpoint;
  for each of a plurality of pixels of a target color image oriented at the target viewpoint:
    for each of the plurality of color images, performing a projection operation by projecting that pixel into a surface of that color image to produce a color of a plurality of colors of that pixel corresponding to that color image; and performing a blending operation on the plurality of colors of that pixel to produce a blended color of that pixel.

17. The computer program product as in claim 11, wherein generating the SDV data includes:

performing a sampling operation along the ray to produce the plurality of locations along that ray, each of the plurality of locations having a spacing to the next location of the plurality of locations, the spacing being proportional to an absolute value of a distance between that location and a surface of the object.

18. The computer program product as in claim 11, wherein determining the location along each of the plurality of rays where the aggregated SDV satisfies the specified condition includes:

identifying a location of the plurality of locations at which the aggregated SDV changes sign; and performing a binary search operation over a region defined by the identified location and a previous location to produce a location of a root.

19. The computer program product as in claim 11, wherein generating the SDV data includes, for each of the plurality of depth images:

at a location of the plurality of locations along the ray, measuring, as the SDV, a distance along the viewpoint along which that depth image is captured between the location and a surface of the object corresponding to the viewpoint.

20. An electronic apparatus configured to render images of objects, the electronic apparatus comprising:

memory; and controlling circuitry coupled to the memory, the controlling circuitry being configured to:

receive a depth image data representing a plurality of depth images of an object, each of the plurality of depth images being a depth image of the object captured from a respective viewpoint, the depth image representing a distance between an image capture device and the object;

receive viewpoint data representing a target viewpoint of an image of the object, the target viewpoint being different from the respective viewpoint from which each of the plurality of depth images are captured, the image including a plurality of pixels;

generate ray data representing a plurality of rays toward the image, each of the plurality of rays corresponding to a respective pixel of the plurality of pixels of the image;

for each of the plurality of rays:

generate signed distance value (SDV) data representing a plurality of SDVs at each of a plurality of locations along that ray, each of the plurality of SDVs at each of the plurality of locations along that ray corresponding to a respective depth image of the plurality of depth images;

perform an aggregation operation on the SDV data at each of the plurality of locations along that ray to produce aggregated SDV data along that ray representing an aggregated SDV at each of the plurality of locations along the ray; and determining a location along that ray where the aggregated SDV satisfies a specified condition; and generate a depth image of the object captured from the perspective of the target viewpoint based on the locations along the plurality of rays for which the respective aggregated SDV for that ray satisfies the specified condition.

* * * * *